(12) United States Patent
Uno

(10) Patent No.: US 7,245,171 B2
(45) Date of Patent: Jul. 17, 2007

(54) VOLTAGE CLAMPING CIRCUIT FOR A BICYCLE DYNAMO

(75) Inventor: Kouji Uno, Osaka (JP)

(73) Assignee: Shimano, Inc., Sakai, Osaka (JP)

( * ) Notice: Subject to any disclaimer, the term of this patent is extended or adjusted under 35 U.S.C. 154(b) by 0 days.

(21) Appl. No.: 10/340,238

(22) Filed: Jan. 9, 2003

(65) Prior Publication Data
US 2003/0141918 A1    Jul. 31, 2003

(30) Foreign Application Priority Data
Jan. 30, 2002   (JP)   ............................. 2002-021158

(51) Int. Cl.
  H03K 5/08   (2006.01)
  H03L 5/00   (2006.01)
(52) U.S. Cl. ...................................... 327/313; 327/318
(58) Field of Classification Search ................ 327/309, 327/310, 313, 327, 328; 361/90, 91.1, 56
See application file for complete search history.

(56) References Cited

U.S. PATENT DOCUMENTS

| | | | | |
|---|---|---|---|---|
| 3,792,307 | A * | 2/1974 | Baker | 315/77 |
| 5,050,060 | A * | 9/1991 | Geuns | 363/126 |
| 5,457,422 | A * | 10/1995 | Rotay | 327/538 |
| 5,675,311 | A * | 10/1997 | Burnett et al. | 340/384.4 |
| 5,841,169 | A * | 11/1998 | Beasom | 257/355 |
| 6,492,859 | B2 * | 12/2002 | Vashchenko et al. | 327/310 |
| 6,560,081 | B1 * | 5/2003 | Vashchenko et al. | 361/56 |
| 2002/0057540 | A1 * | 5/2002 | Ito et al. | 361/18 |

FOREIGN PATENT DOCUMENTS

| | | |
|---|---|---|
| DE | 3347495 A1 | 7/1985 |
| DE | 19522090 A1 | 1/1997 |
| FR | 2727265 A1 | 5/1996 |
| JP | 5-238447 | 9/1993 |
| JP | 7-10056 | 1/1995 |
| JP | 7-223573 | 8/1995 |

OTHER PUBLICATIONS

Sedra et al., Microelectronic Circuits, 1991, Saunders College publishing, third edition, 675.*
Sedra et al., Microelectronic Circuit, 1991, Saunders College, Third Edition, p. 196.*
Thomas et al., The Analysus and Design of Linear Circuits, Alan Apt, pp. 34-35.*
Witthon, "Elektrischer Fahrradantrieb," Elektronik, 1991, vol. 40, No. 21, Franzis Verlag GMBH, Munich, Germany.
Fry, "Bike Battery Charger," Electronics World & Wireless World, Dec. 1994, vol. 100, No. 1705, Reed Business Publishing, Sutton, Surrey, Great Britain.

* cited by examiner

Primary Examiner—Quan Tra
(74) Attorney, Agent, or Firm—James A. Deland

(57) ABSTRACT

A voltage clamping circuit comprises a first high current gain circuit adapted to receive current from the first line; and a first switching circuit that turns on the first high current gain circuit to flow current away from the first line when the first switching circuit senses a first voltage from the first line above a clamping voltage, and turns off the first high current gain circuit when the first switching circuit senses the first voltage below the clamping voltage.

13 Claims, 8 Drawing Sheets

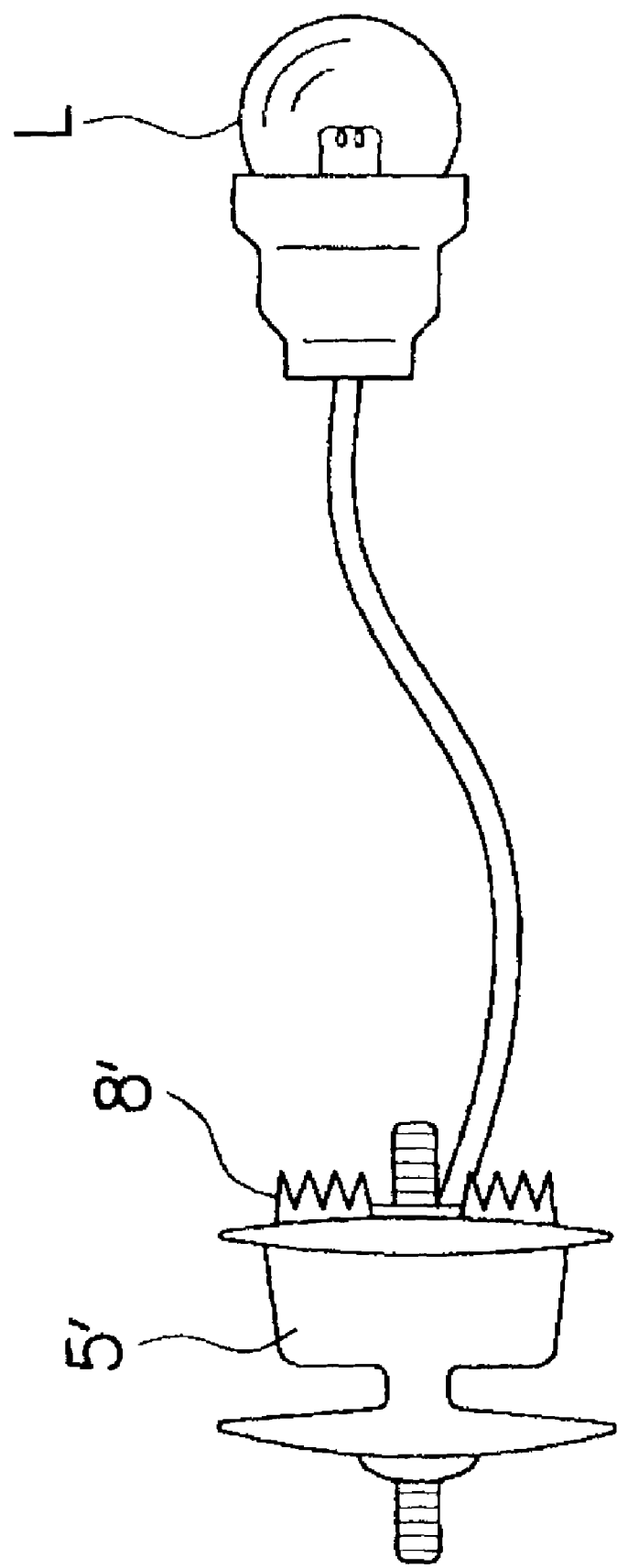

VOLTAGE CLAMPING CIRCUIT FOR A BICYCLE DYNAMO

BACKGROUND OF THE INVENTION

The present invention is directed to bicycles and, more particularly, to various inventive features of a circuit used with bicycle dynamos.

Bicycles are equipped with dynamos for the purpose of illuminating headlamps, powering electrical components, and so on. The voltage generated by a dynamo is typically proportional to the speed of the bicycle which, in turn, is determined by the rate of rotation of the wheels. At high speed, the voltage can exceed 100 V in some instances. It is therefore necessary to design electrical components powered by the voltage generated by the dynamo to be able to withstand such high voltage. Unfortunately, components designed to withstand high voltages lack general application and tend to be expensive as well.

Another difficulty arising from the generation of voltages from a dynamo is fluctuation in the electrical load connected to a dynamo which, in turn, can result in bursts of extremely high voltage, termed "surge voltage". Thus, a circuit for clamping voltage is needed to enable the use of standard electrical components and the like, as well as to protect components from extremely high voltage.

Conventional clamping circuits proposed to date include a circuit like that illustrated in FIG. 1. This conventional circuit is a bidirectional voltage clamping circuit having two Zener diodes. When positive voltage is output at the positive (+) terminal of dynamo GE, then element DZ1 functions as a Zener diode, and element DZ2 functions as a normal rectifier diode. Similarly, when positive voltage is output at the negative (−) terminal of dynamo GE, then element DZ2 functions as a Zener diode, and element DZ1 functions as a normal rectifier diode.

With the circuit illustrated in FIG. 1, $$Vc1 = Vz1 + Vf2 \quad (1)$$

where $Vc1$ is the clamping voltage for the dynamo voltage, $Vz1$ is the Zener voltage of element Dz1, and $Vf2$ is the forward voltage of element Dz2. When positive voltage is output at the negative (−) terminal of dynamo GE, the clamping voltage $Vc2$ for dynamo voltage is given by $$Vc2 = Vz2 + Vf1.$$

Such a conventional clamping circuit has the advantage of relatively few parts. However, diodes Dz1 and Dz2 tend to generate heat, which can lead to problems in degraded characteristics. Assume, for example, that clamping voltage is set to $Vc1 = Vc2 = 10$ V; semiconductor junction temperature Tj prior to clamping is 25° C.; current flow to elements Dz1 and Dz2 during clamping is constant; and semiconductor junction temperature at thermal equilibrium after commencing clamping is 100° C. When $Vz1 = 9.1$ and $Vf2 = 0.9$, at the instant of clamping, Equation (1) gives:

$$Vc1 = 9.1 + 0.9 = 10 \ (V)$$

whereas at thermal equilibrium, where the temperature coefficient $\alpha T = 5$ (mV/° C.), $$Vc1 = 9.1 + (\alpha T/1000) \times (100-25) + 0.9 = 10.375 \ (V).$$

Thus, there is a significant variation in the clamped voltage.

To reduce degradation in characteristics due to heat generation, it is possible to design a circuit like that illustrated in FIG. 2. In this circuit, current flow is sensed by a current sensor element A. Loss P occurring in elements DZ1 and DZ2 is calculated from the current value Iz and clamping voltage Vc as follows:

$$P = Vc \times Iz.$$

If loss P increases, then a switching element SW is opened to limit current flowing to the circuit.

However, such a circuit requires elements with high withstand voltage for the switch SW and sensor A controlling it. Another drawback is the increased number of components required. Furthermore, where a device is charged by the dynamo, failure to charge adequately may result from the operation of the switch.

Another possibility is a circuit like that shown in FIG. 3. In this circuit, the voltage Vty across the anode and cathode of a thyristor Th is sensed, and a trigger pulse is applied to the gate at the instant the voltage Vty exceeds a preset voltage. Application of a trigger pulse produces shorting (conduction) across the anode and cathode of the thyristor so that voltage Vty drops to around 0 V. Shorting continues until the current across the anode and cathode falls below the characteristic holding current of the thyristor.

However, this circuit design has problems, particularly when the signal produced by the dynamo is used to generate pulses that indicate bicycle speed. For example, FIG. 4(*a*) shows the waveforms generated during operation of a typical dynamo and speed sensing circuit; FIG. 4(*b*) shows the waveforms generated during operation of a dynamo and speed sensing circuit constructed in accordance with FIGS. 1 and 2; and FIG. 4(*c*) shows the waveforms generated during operation of a dynamo and speed sensing circuit constructed in accordance with the clamping circuit shown in FIG. 3. In each figure, Vs is the decision voltage for producing a speed sensing pulse, and the resultant pulse will have the shape shown at the bottom of each figure. The pulses produced by a dynamo and speed sensing circuit constructed in accordance with FIGS. 1 and 2 are the same as the pulses generated during the operation of a typical dynamo and speed sensing circuit. Thus, speed can be sensed with no particular problems using these pulses. However, when a clamping circuit has been designed with a thyristor-shorted circuit as shown in FIG. 4, clamping will produce a waveform like that shown at the top of FIG. 4(*c*) due to the tendency to drop to 0 V when clamped by the clamping thyristor. As a result, the pulse produced by decision voltage Vs will have a disturbed waveform like that shown at the bottom FIG. 4(*c*), thus making it impossible to sense speed accurately.

SUMMARY OF THE INVENTION

The present invention is directed to various inventive features of a circuit used with bicycle dynamos. In one inventive feature, the voltage clamping circuit comprises a first high current gain circuit adapted to receive current from the first line; and a first switching circuit that turns on the first high current gain circuit to flow current away from the first line when the first switching circuit senses a first voltage from the first line above a clamping voltage, and turns off the first high current gain circuit when the first switching circuit senses the first voltage below the clamping voltage.

Among other things, there is now provided an inexpensive circuit having minimal thermally-induced degradation of characteristics. Where speed pulses are generated using voltage generated by the dynamo, speed can be sensed accurately. Additional inventive features will become apparent from the description below, and such features alone or in combination with the above features may form the basis of further inventions as recited in the claims and their equivalents.

BRIEF DESCRIPTION OF THE DRAWINGS

FIG. 13 is an alternative physical embodiment of a voltage clamping circuit constructed for a bicycle dynamo.

DETAILED DESCRIPTION OF THE EMBODIMENTS

Figure 5:
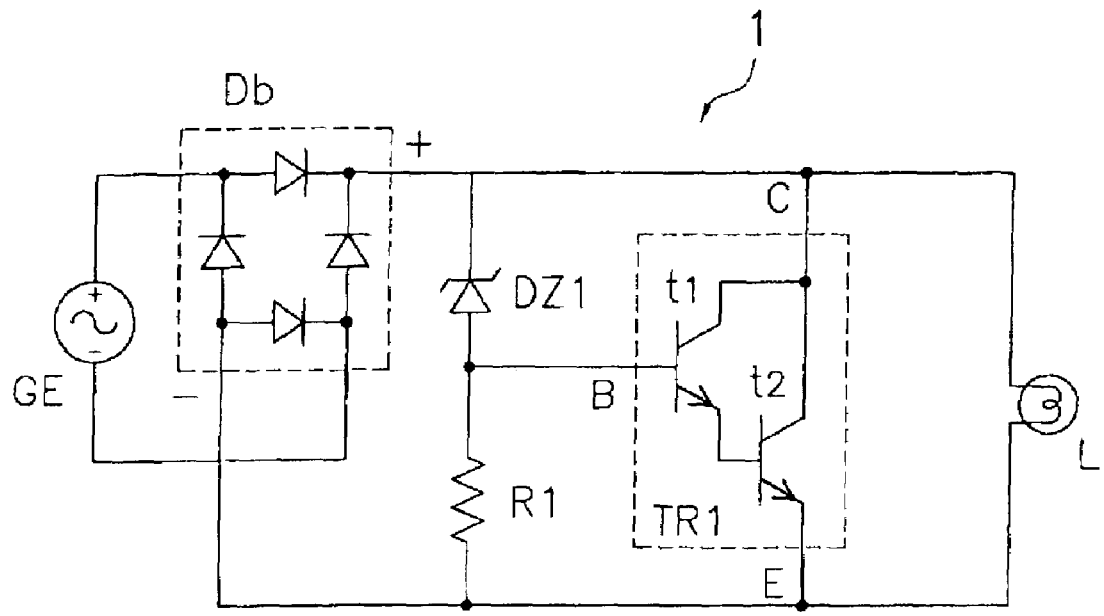
FIG. 5 is a schematic diagram of an embodiment of a voltage clamping circuit with inventive features.

FIG. 5 is a schematic diagram of an embodiment of a voltage a clamping circuit 1 with inventive features. This voltage clamping circuit 1 comprises a bridge circuit Db connected to a dynamo GE, and a load L such as a headlamp. Dynamo GE may be a hub dynamo integrally provided in a hub of the bicycle. Bridge circuit Db has four diodes connected to provide full wave rectification of the output of dynamo GE. Clamping circuit 1 clamps the output voltage of bridge circuit Db to a predetermined voltage (clamping voltage) and supplies the clamping voltage to the load L. Clamping circuit 1 includes a power transistor circuit TR1. A Zener diode DZ1 and a resistor R1 are provided for controlling the on/off operation of transistor circuit TR1.

Transistor circuit TR1 includes two NPN bipolar transistors t1, t2 connected in series (a Darlington connection in this example). Transistor circuit TR1 also is connected in parallel with headlamp L. In this example, the collector of transistor t1 is connected to the positive terminal of bridge circuit Db, and the emitter of transistor t2 is connected to the negative terminal of bridge circuit Db.

The Zener diode DZ1 functions as a switching element that operates at a Zener voltage Vz1, and it is connected so as to apply reverse bias across the positive terminal of bridge circuit Db and to the base of transistor t1 during normal unclamped operation. During operation, the power output of dynamo GE is rectified by bridge circuit Db and then applied to transistor circuit TR1 and headlamp L. As long as the generated voltage is below a predetermined voltage, the Zener diode DZ1 blocks the flow of current to the base of transistor t1, and transistor circuit TR1 remains off. As a result, unregulated voltage is applied to headlamp L.

If, on the other hand, the generated voltage goes above the predetermined voltage, current flows through Zener diode DZ1 so that a forward biasing voltage is applied across the base and emitter of transistor t11. As a result, transistors t1 and t2 become conductive, and the entire transistor circuit TR1 is switched on. Current flows through transistor circuit TR1 so that the predetermined (clamping) voltage is applied to headlamp L.

Clamping voltage Vc is given by $$Vc = 2 \times Vfd1 + Vz1 + Vbe$$

In this equation, Vfd1 is the forward voltage of an individual diode in bridge circuit Db, and Vbe is the voltage across the base and emitter of transistor circuit TR1 when switched on. Equivalent impedance across the base and emitter of transistor circuit TR1 varies so as to maintain this clamping voltage Vc.

In this embodiment, by constructing the transistor circuit TR1 of two Darlington connected transistors, gain may be increased, and current flow through the Zener diode may be minimized. This, in turn, reduces the amount of generated heat and holds to a minimum the degradation in characteristics due to heat and current fluctuations. Also, the clamping voltage is relatively stable. Since the dynamo waveform is resistant to disturbance, speed pulses also may be accurately generated to calculate the speed of the bicycle.

Figure 6:
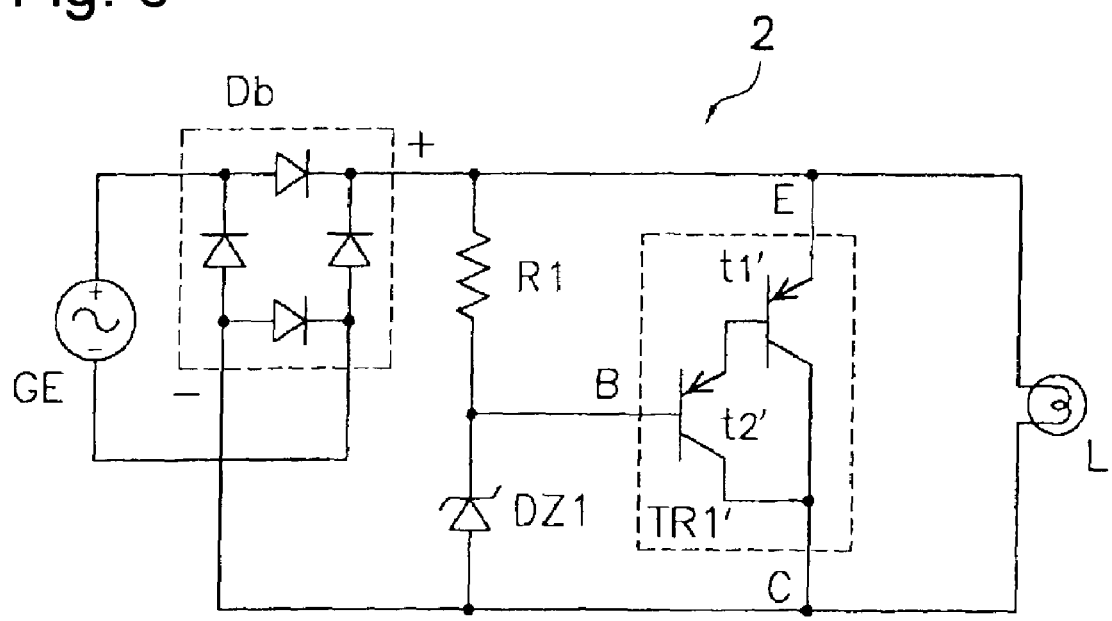
FIG. 6 is a schematic diagram of another embodiment of a voltage clamping circuit with inventive features.

FIG. 6 is a schematic diagram of another voltage a clamping circuit 2 with inventive features. Voltage clamping circuit 2 employs PNP bipolar transistors for a transistor circuit TR1'. While the polarity is different, the basic arrangement is the same as that of the circuit shown in FIG. 5. More specifically, transistor circuit TR1' includes two Darlington connected PNP bipolar transistors t1', t2', arranged with the emitter of transistor t1' connected to the positive terminal of bridge circuit Db and the collector of transistor t2' connected to the negative terminal of bridge circuit Db. A Zener diode DZ1 serving as the switching element is connected so as to apply reverse bias across the base of transistor t2' of transistor circuit TR1' and the negative terminal of bridge circuit Db during unclamped operation. The circuit operates in the same manner as the circuit shown in FIG. 5

Figure 7:
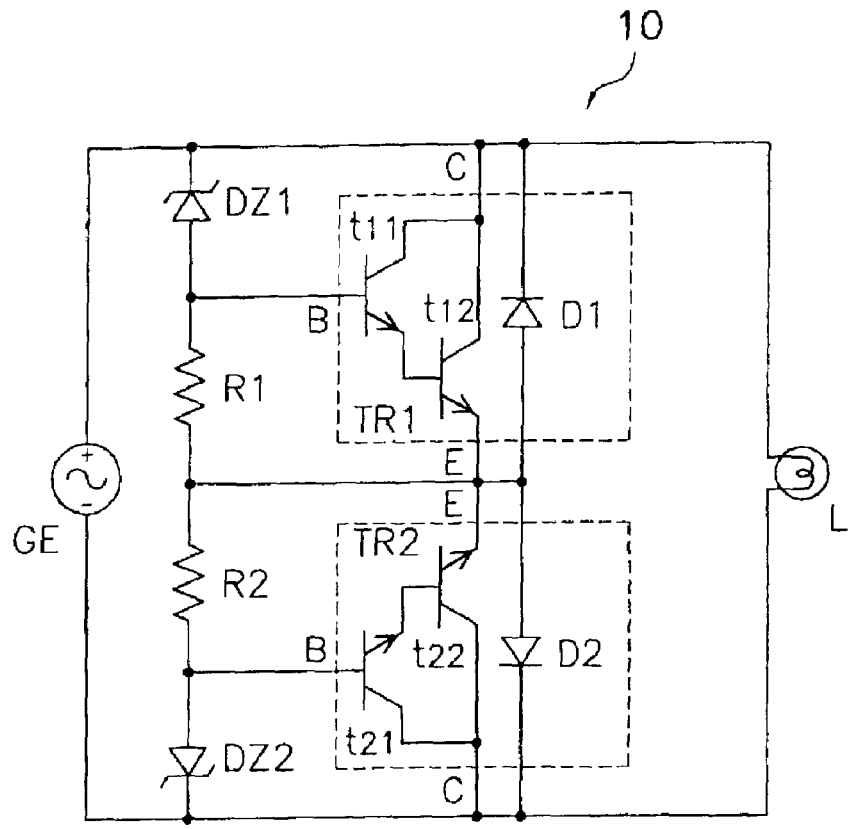
FIG. 7 is a schematic diagram of another embodiment of a voltage clamping circuit with inventive features.

FIG. 7 is a schematic diagram of another voltage clamping circuit 10 with inventive features. Voltage clamping circuit 10 is connected in parallel with a dynamo GE and with a headlamp or other load L. Clamping circuit 10 comprises first and second power transistor circuits TR1 and TR2; first and second Zener diodes DZ1 and DZ2; first and second resistors R1, R2 connected to the Zener diodes DZ1 and DZ2, respectively; and first and second diodes D1 and D2 serving as rectifier elements. As in the preceding embodiments, dynamo GE may be a hub dynamo integrally provided to a hub of the bicycle.

First power transistor circuit TR1 includes two Darlington connected NPN bipolar transistors t11 and t12 that are connected in parallel with respect to headlamp L. More specifically, the collector of transistor t11 is connected to the positive terminal of dynamo GE, and the emitter of transistor t12 is connected via second diode D2 to the negative terminal of dynamo GE.

First Zener diode DZ1 operates at Zener voltage Vz1, and it is connected so as to apply reverse bias across the positive terminal of dynamo GE and the base of transistor t11. First diode D1 is connected in parallel with first transistor circuit TR1 and so as to apply forward bias when positive voltage is output at the negative terminal of dynamo GE.

Second power transistor circuit TR2 includes two Darlington connected NPN bipolar transistors t21 and t22 that are connected in parallel with respect to headlamp L. More specifically, the collector of transistor t21 is connected to the negative terminal of dynamo GE, and the emitter of transistor t22 is connected via first diode D1 to the positive terminal of dynamo GE.

Second Zener diode DZ2 operates at Zener voltage Vz2, and it is connected so as to apply reverse bias across the negative terminal of dynamo GE and the base of transistor t21. Second diode D2 is connected in parallel with second transistor circuit TR2 and so as to apply forward bias when positive voltage is output at the positive terminal of dynamo GE.

With this circuit arrangement, as long as positive voltage is output at the positive terminal of dynamo GE and the generated voltage is below a predetermined voltage, the flow of current to the base of transistor t11 is blocked by the Zener diode DZ1, so first transistor circuit TR1 remains off. Thus, substantially all of the generated voltage (excepting some circuit loss in the components) is applied to headlamp L.

If the generated voltage goes above the predetermined voltage, then current flows through first Zener diode DZ1 so that a forward biasing voltage is applied across the base and emitter of transistor t11 of first transistor circuit TR1. Transistors t11 and t12 become conductive, and current flows along the path: dynamo GE→first transistor circuit TR1→second diode D2→dynamo GE, and the predetermined voltage (clamping voltage) is applied to headlamp L. In this instance, the second transistor circuit TR2 does not function.

In this case, the clamping voltage Vc is given by $$Vc=Vfd2+Vz1+Vbe1$$

where Vfd2 is the forward voltage of the second diode D2, and Vbe1 is the voltage across the base and emitter with first transistor circuit TR1 in the conductive state.

If, on the other hand, positive voltage is output at the negative terminal of dynamo GE and the generated voltage is below a predetermined voltage, the flow of current is blocked by Zener diode DZ2, and transistor circuit TR2 is off. Thus, substantially all of the generated voltage (excepting some circuit loss in the components) is applied to headlamp L.

If the generated voltage subsequently goes above the predetermined voltage, current flows through second Zener diode DZ2 so that forward biasing voltage is applied across the base and emitter of transistor t21 of second transistor circuit TR2. Transistors t21 and t22 become conductive, and current flows along the path: dynamo GE→second transistor circuit TR2→first diode D1→dynamo GE, and clamping voltage is applied to headlamp L. In this instance, the first transistor circuit TR1 does not function. The clamping voltage is analogous to that described previously.

Figure 1:
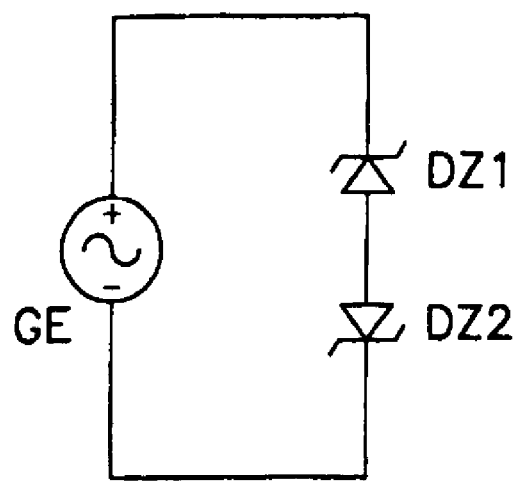
FIG. 1 is a schematic diagram of a conventional voltage clamping circuit.
Figure 2:
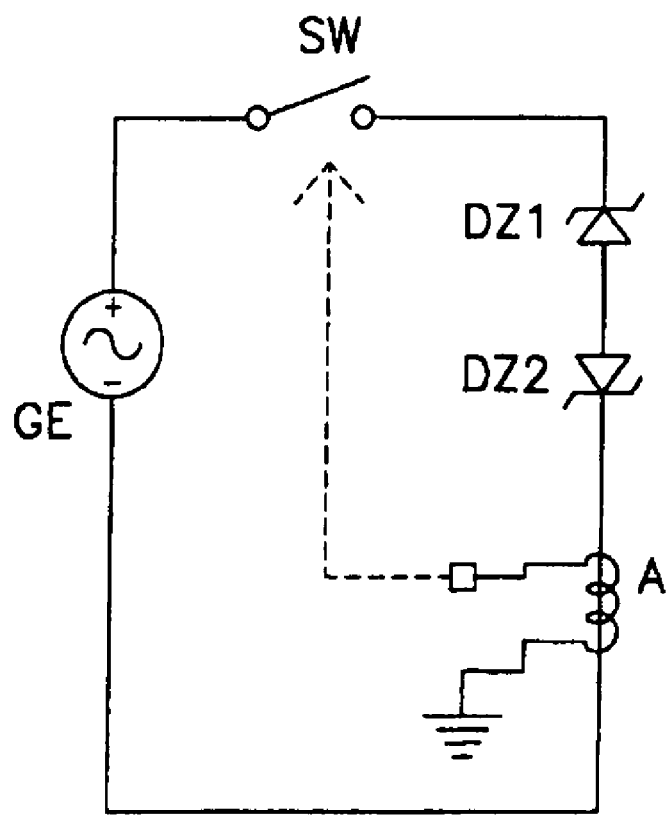
FIG. 2 is a schematic diagram of an improvement to the circuit of FIG. 1.
Figure 3:
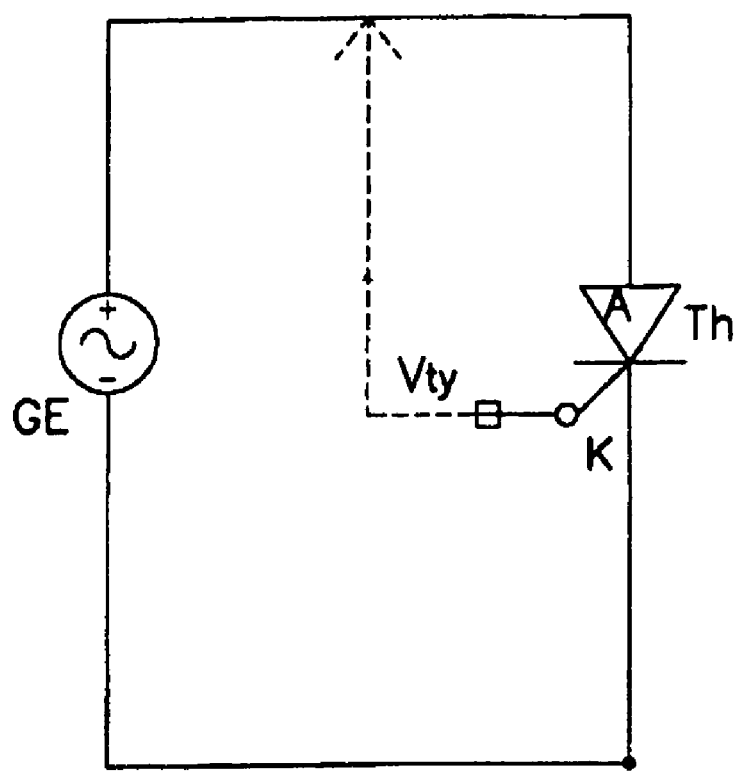
FIG. 3 is a schematic of another conventional voltage clamping circuit.
Figure 4A:
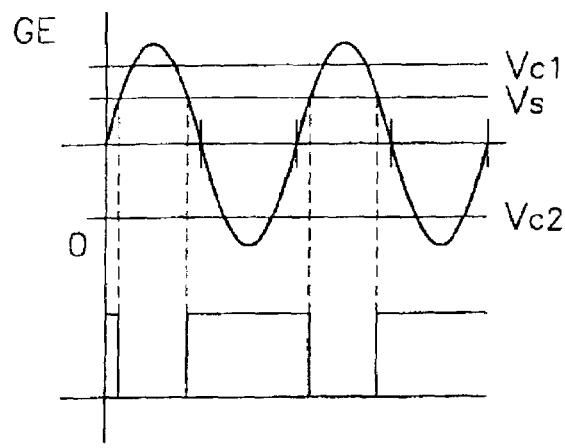
FIGS. 4(a)-4(c) show waveforms of speed sensing pulses generated from dynamo outputs.
Figure 4B:
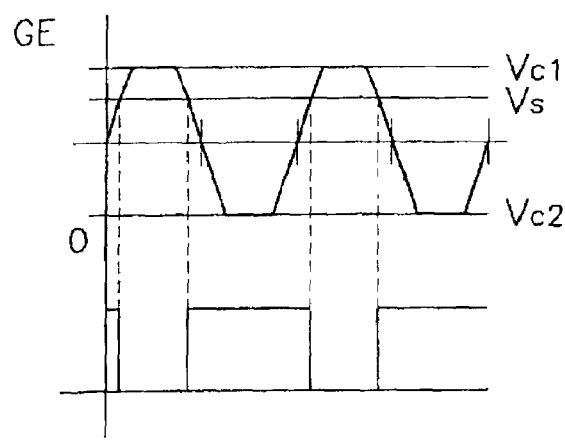
Figure 4C:
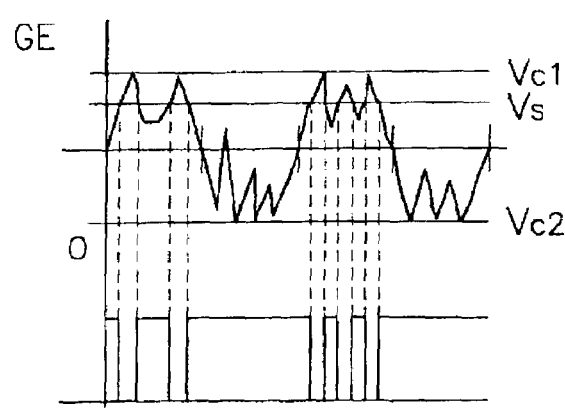

Darlington connected transistor power circuits typically incorporate diode elements to prevent reverse electromotive force from being applied to transistors. This embodiment employs such diode elements (D1 and D2), thus allowing the circuit to be constructed more cheaply. By virtue of being provided with first and second diodes D1, D2, the circuit of this embodiment offers, in addition to similar advantages to the embodiment shown in FIG. 5, the further advantage of obviating the need for the bridge circuit provided as a rectifier circuit in FIG. 5. In this embodiment, of the factors determining clamping voltage, there is only one diode forward voltage, thus affording more consistently accurate clamping voltage. Additionally, since one of the half-wave components of the dynamo output is handled by the first transistor circuit TR1 and the other half-wave component is handled by the second transistor circuit TR2, the amount of heat per unit of time produced by a single transistor is half that in the embodiment shown in FIG. 1, thus allowing for greater thermal resistance from the transistor junction to the air.

More specifically, let it be assumed that loss P occurring in the circuit shown in FIG. 5 is 5 W, and similarly that loss P generated in the circuit shown in FIG. 7 is 5 W. Clamping voltage in each circuit is 10 V, and forward voltage drop at each diode is 0.6 V.

If the loss j occurring in transistor circuit TR1 and diode D1 in the circuit shown in FIG. 5 are respectively denoted as Ptr and Pdi, then $$Pdi=(P/Vc)\times 0.6\times 2=(5/10)\times 0.6\times 2=0.6 \text{ (W)}, \text{ and}$$

$$Ptr=P-Pdi=4.4 \text{ (W)}.$$

The losses occurring in (TR1+D1) and (TR1+D2) in the circuit shown in FIG. 7 (denoted as Ptr1 and Ptr2), are:

$$Ptr1=P/2=5/2=2.5 \text{ (W)}, \text{ and}$$

$$Ptr2=P/2=5/2=2.5 \text{ (W)}.$$

The transistors used in the/circuit shown in FIG. 5 and the circuit shown in FIG. 7 are each assumed to have:

an upper limit of junction withstand temperature Tj(max) =150 (° C.);

a thermal resistance between junction and package Rth (j–c)=3.125 (° C./W);

a thermal resistance between the package and radiator junction Rth (c)=1.5 (° C./W); and a radiator having an infinite surface area Tf=30° C.

Figure 8:
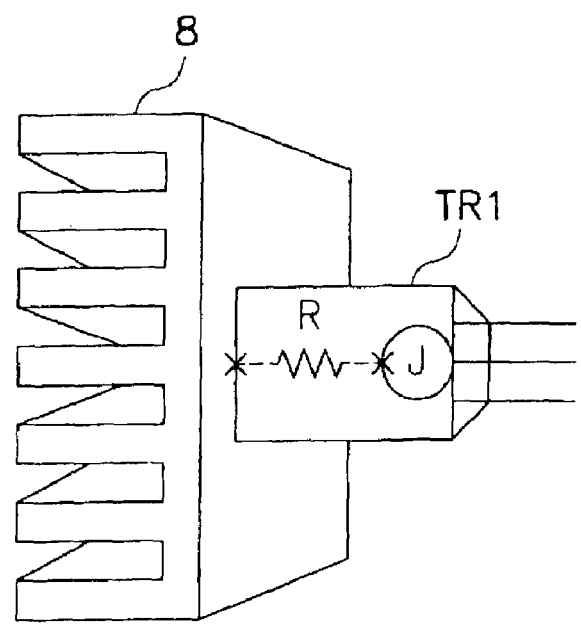
FIG. 8 is a partial schematic diagram of a circuit according to the embodiment shown in FIGS. 5 and 6.
Figure 9:
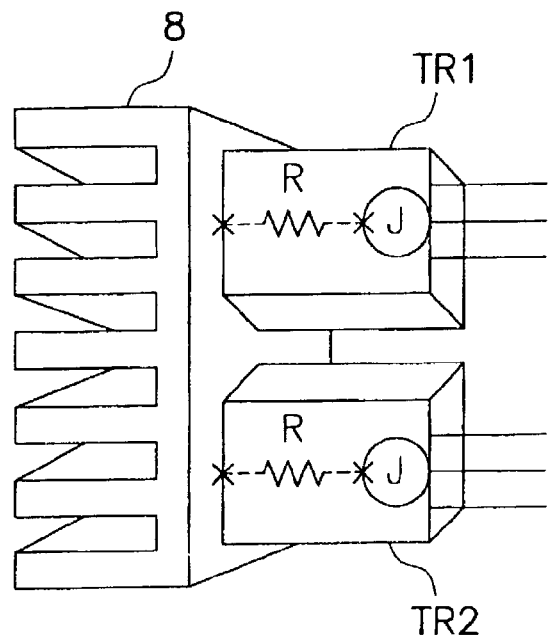
FIG. 9 is a partial schematic diagram of a circuit according to the embodiment shown in FIG. 7.

The circuits shown in FIGS. 5 and 7 are modeled in FIGS. 8 and 9, respectively.

Thermal resistance R between the transistor junction J and the radiator 8 shown in given by:

$$R=Rth\ (j-c)+Rth\ (c)=3.125+1.5=4.625 \text{ (° C./W)},$$

and junction J temperature is given by:

$$Tf+R\times Ptr=30+4.625\times 4.4=50.35\ (° C.) \quad \text{①}$$

Thermal resistance R between the transistor junction J and the radiator 8 shown in given by:

$$Tf+R\times Ptr1=30+4.625\times 2.5=41.56\ (° C.) \quad \text{②}$$

From the results of equations ① and ② it will be apparent that with the above parameters, the circuit shown in FIG. 7 has greater latitude in terms of transistor junction temperature. Conversely, the circuit shown in FIG. 7 allows for higher package thermal resistance. Consequently, an inexpensive transistor with a small package can be used. This also has the advantage that two medium sized transistors have relatively lower thermal resistance with the radiator than does one large sized transistor.

Figure 10:
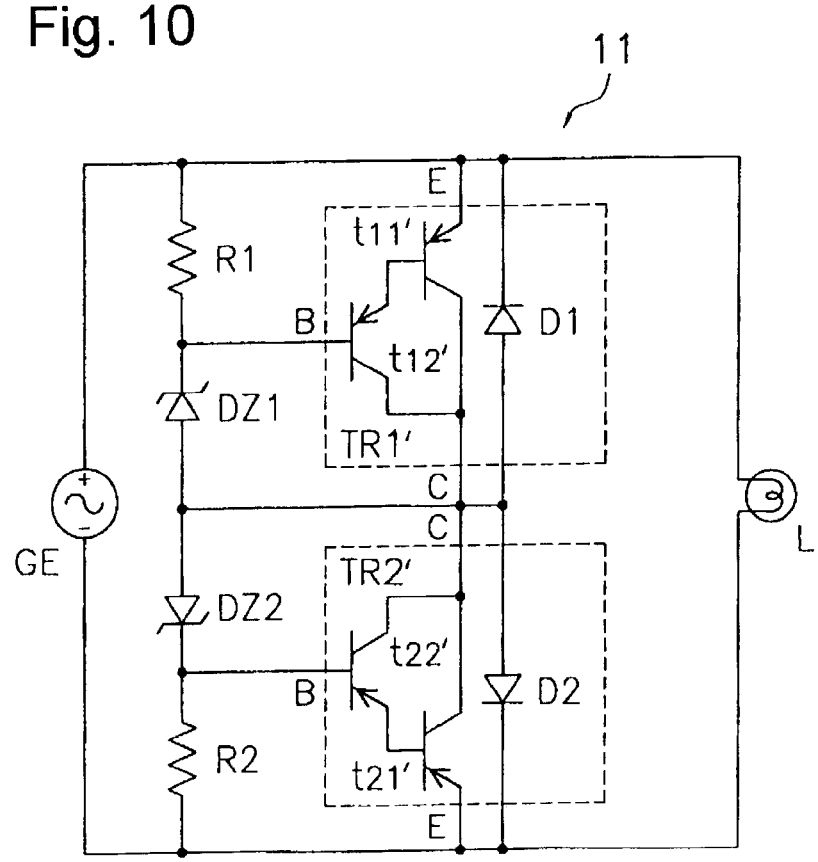
FIG. 10 is a schematic diagram of another embodiment of a voltage a clamping circuit with inventive features.

A voltage clamping circuit according to a fourth embodiment is illustrated in FIG. 10. The circuit shown in this embodiment employs PNP bipolar transistors for first and second transistor circuits TR1, TR2. While the polarity is different, the basic arrangement is the same as that of the circuit shown in FIG. 7.

More specifically, first and second transistor circuits TR1', TR2' each include two Darlington connected PNP bipolar transistors t11', t12', t21', t22', with the emitter of transistor t11' of the first transistor circuit TR1' connected to the positive terminal of dynamo GE, and the collector of transistor t12' connected via a second diode D2 to the negative terminal of dynamo GE. The emitter of transistor t21' of the second transistor circuit TR2' is connected to the negative terminal of dynamo GE, and the collector of transistor t22' is connected via a first diode D1 to the positive terminal of generator GE. A first Zener diode DZ1 is connected so as to apply reverse bias across the base of transistor t12' of first transistor circuit TR1' and the negative terminal of dynamo GE, and a second Zener diode DZ2 is connected so as to apply reverse bias across the base of transistor t22' of second transistor circuit TR2' and the positive terminal of dynamo GE. The first and second diodes D1, D2 are the same as those in the embodiment shown in FIG. 7, and the operation of this embodiment is analogous to the embodiment shown in FIG. 7.

Figure 11:
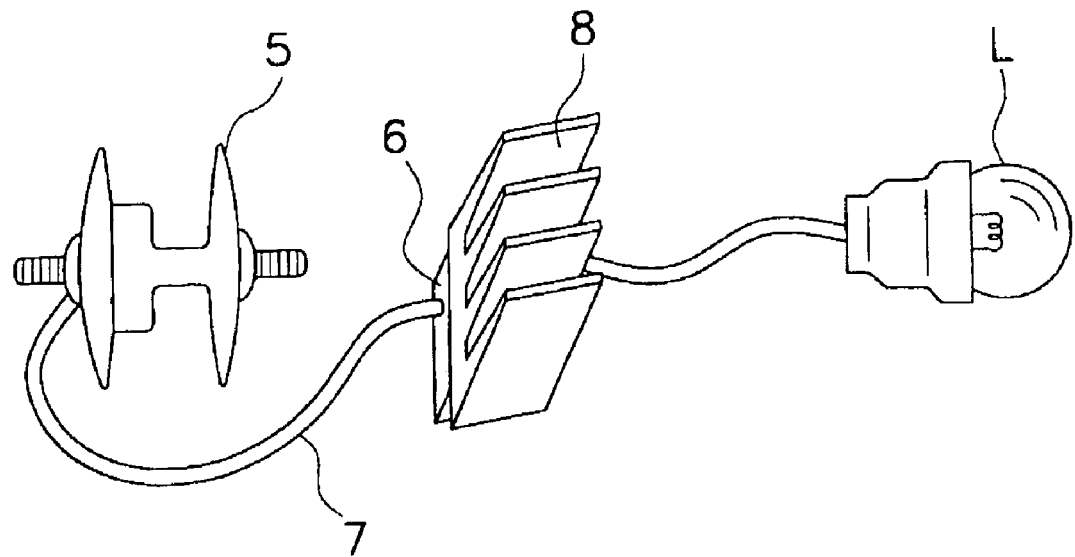
FIG. 11 is an alternative physical embodiment of a voltage clamping circuit constructed for a bicycle dynamo.
Figure 12:
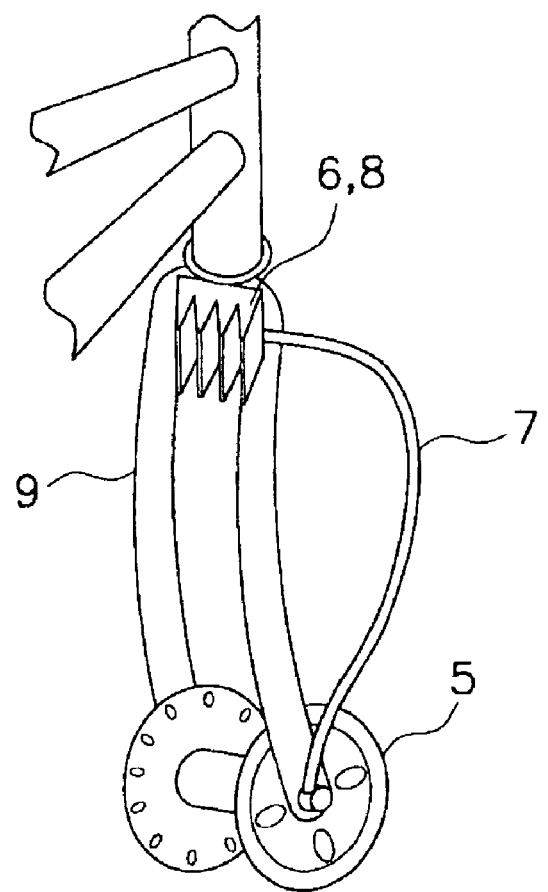
FIG. 12 is a physical embodiment of the voltage clamping circuit shown in FIG. 11 mounted to a bicycle.

Exemplary installations of a voltage clamping circuit pertaining to any of the preceding embodiments are illustrated in FIGS. 11-13. In the example shown in FIG. 11, a box 6 separate from the hub dynamo 5 is disposed between hub dynamo 5 and headlamp L, with the voltage clamping circuit being housed within this box 6. The hub dynamo 5 and voltage clamping circuit within the box are connected by electrical wire 7. A radiator fin 8 is provided to the box 6 housing the voltage clamping circuit. The box 6 provided with the radiator fin 8 may be secured, for example, to the upper end of the front fork 9, as shown in FIG. 12. In the example shown in FIG. 13, the voltage clamping circuit is housed within a hub dynamo 5', and the hub dynamo 5' may be provided with a fin 8'.

While the above is a description of various embodiments of inventive features, further modifications may be employed without departing from the spirit and scope of the present invention. For example, the transistor circuits may be fabricated using FETs rather than bipolar transistors, although the turn-on voltage of bipolar transistors is more stable. A transistor circuit may be fabricated from a single transistor element or some other circuit element, provided that the desired gain is achieved (e.g., current gain of 50-200 per transistor in some embodiments).

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A voltage clamping circuit for receiving a voltage from a bicycle dynamo and for applying a clamped voltage to a bicycle integrated load, wherein the voltage clamping circuit comprises:
    a first power transistor circuit having a first power transistor circuit input and a first power transistor circuit output, wherein the first power transistor circuit is adapted to be connected in parallel to the bicycle integrated load so that current is allowed to flow when a positive terminal of the dynamo is outputting a positive voltage;
    a first switching element that switches on the first power transistor circuit when voltage applied to the bicycle integrated load exceeds a predetermined voltage, and that switches off the first power transistor circuit when voltage applied to the bicycle integrated load is below the predetermined voltage;
    a first rectifier element connected to the first transistor circuit such that current is allowed to flow from the first power transistor circuit output to the first power transistor circuit input and current is preventing from flowing from the first power transistor circuit input to the first power transistor circuit output;
    a second power transistor circuit having a second power transistor circuit input and a second power transistor circuit output, wherein the second power transistor circuit is adapted to be connected in parallel to the bicycle integrated load so that current is allowed to flow when a negative terminal of the dynamo is outputting a positive voltage;
    a second switching element that switches on the second power transistor circuit when voltage applied to the bicycle integrated load exceeds a predetermined voltage, and that switches off the second power transistor circuit when voltage applied to the bicycle integrated load is below the predetermined voltage; and
    a second rectifier element connected to the second power transistor circuit such that current is allowed to flow from the second power transistor circuit output to the second power transistor circuit input and current is preventing from flowing from the second power transistor circuit input to the second power transistor output.

2. The circuit according to claim 1 wherein the first power transistor circuit comprises first and second Darlington-connected bipolar transistors, and wherein the second power transistor circuit comprises third and fourth Darlington-connected bipolar transistors.

3. The circuit according to claim 2 wherein the first rectifier element comprises a first diode, and wherein the second rectifier element comprises a second diode.

4. The circuit according to claim 3 wherein the first switching element comprises a first Zener diode connected to a base of a transistor in the first power transistor circuit, and wherein the second switching element comprises a second Zener diode connected to a base of a transistor in the second power transistor circuit.

5. A voltage clamping circuit adapted to receive a voltage from a bicycle dynamo over a first line and a second line and for applying a clamped voltage from the first line and the second line to a bicycle integrated load, wherein the voltage clamping circuit comprises:
    a first high current gain circuit adapted to receive current from the first line;
    a first switching circuit that turns on the first high current gain circuit to flow current away from the first line when the first switching circuit senses a first voltage from the first line above a clamping voltage, and turns off the first high current gain circuit when the first switching circuit senses the first voltage below the clamping voltage;
    a second high current gain circuit adapted to receive current from the second line; and
    a second switching circuit that turns on the second high current gain circuit to flow current away from the second line when the second switching circuit senses a second voltage from the second line above the clamping voltage, and turns off the second high current gain circuit when the second switching circuit senses the second voltage below the clamping voltage.

6. The circuit according to claim 5 wherein the first high current gain circuit comprises a plurality of first transistors connected in series, and wherein the second high current gain circuit comprises a plurality of second transistors connected in series.

7. The circuit according to claim 6 further comprising:
a first rectifier circuit connected in series with the plurality of first transistors; and
a second rectifier circuit connected in series with the plurality of second transistors.

8. The circuit according to claim 7 wherein the first rectifier circuit is coupled for flowing the current from the first high current gain circuit to the second line, and wherein the second rectifier circuit is coupled for flowing the current from the second high current gain circuit to the first line.

9. The circuit according to claim 8 wherein the first high current gain circuit has a first high current gain circuit input and a first high current gain circuit output, wherein the first high current gain circuit input is coupled for receiving current from the first line, wherein the second high current gain circuit has a second high current gain circuit input and a second high current gain circuit output, wherein the second high current gain circuit input is coupled for receiving current from the second line, wherein the second rectifier circuit allows current flow from the first high current gain circuit output to the first high current gain circuit input and inhibits current flow from the first high current gain circuit input to the first high current gain circuit output, and wherein the first rectifier circuit allows current flow from the second high current gain circuit output to the second high current gain circuit input and inhibits current flow from the second high current gain circuit input to the second high current gain circuit output.

10. The circuit according to claim 9 wherein the first rectifier circuit comprises a first diode, and wherein the second rectifier circuit comprises a second diode.

11. The circuit according to claim 10 wherein the first switching circuit comprises a first Zener diode coupled for controlling the base of at least one of the plurality of first transistors, and wherein the second switching circuit comprises a second Zener diode coupled for controlling the base of at least one of the plurality of second transistors.

12. The circuit according to claim 11 wherein the plurality of first transistors and the plurality of second transistors each comprises a bipolar transistor.

13. The circuit according to claim 12 wherein the plurality of first transistors comprises at least two Darlington-connected bipolar transistors, and wherein the plurality of second transistors comprises at least two Darlington-connected bipolar transistors.

* * * * *